United States Patent [19]

Kai

[11] Patent Number: 4,526,531

[45] Date of Patent: Jul. 2, 1985

[54] BURNER APPARATUS FOR SMELTING FURNACE

[75] Inventor: Tatsuya Kai, Kobe, Japan

[73] Assignee: Nikko Co., Ltd., Hyogo, Japan

[21] Appl. No.: 501,243

[22] Filed: Jun. 6, 1983

[51] Int. Cl.³ .............................................. F23C 5/06
[52] U.S. Cl. .................................... 431/189; 431/160; 431/186; 239/128; 122/6.6
[58] Field of Search ................. 431/189, 186, 160; 239/128; 432/174; 122/6.5, 6.6

[56] References Cited

U.S. PATENT DOCUMENTS

| | | | |
|---|---|---|---|
| 2,632,503 | 3/1953 | Bailey | 122/6.5 |
| 3,339,614 | 9/1967 | Fleck et al. | 431/189 |
| 4,116,617 | 9/1978 | Backman et al. | 431/186 |
| 4,302,179 | 11/1981 | Pont | 431/189 |
| 4,382,772 | 5/1983 | Wackerbarth et al. | 431/189 |
| 4,437,415 | 3/1984 | Spielman | 122/6.6 |

Primary Examiner—Samuel Scott
Assistant Examiner—Helen Ann Odar
Attorney, Agent, or Firm—Armstrong, Nikaido, Marmelstein & Kubovcik

[57] ABSTRACT

A burner apparatus for a smelting furnace comprising a burner body having a tip insertable into and withdrawable from a burner inserting bore in the wall of the furnace, a seal bar insertable into and withdrawable from the bore for closing the bore, shifting means for alternatively positioning the tip or the seal bar in alignment with the bore, and means for driving the tip and the seal bar into and out of the bore. When the burner is not used for auxiliary combustion, the seal bar is inserted into the bore to prevent the bore and the burner nozzles from clogging with splashes of molten metal and slag.

4 Claims, 14 Drawing Figures

BURNER APPARATUS FOR SMELTING FURNACE

BACKGROUND OF THE INVENTION

The present invention relates to a burner apparatus for smelting furnaces, and more particularly to an auxiliary combustion apparatus for electric furnaces.

Auxiliary combustion apparatus are known for directly burning a mixture of oxygen and fuel oil, kerosene or the like in such a furnace to smelt the charge effectively and rapidly and thereby achieve improved productivity and savings in power.

Auxiliary combustion burner apparatus for smelting furnaces, especially for electric furnaces, include the movable type and the fixed type.

Figure 11:
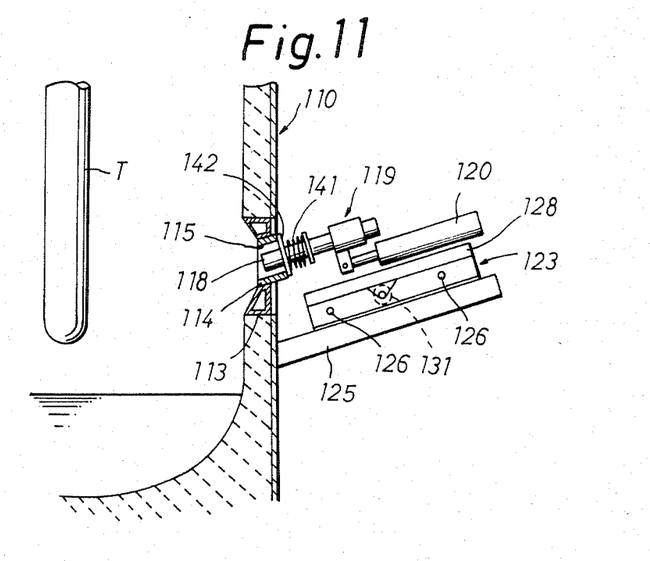
Figure 12:
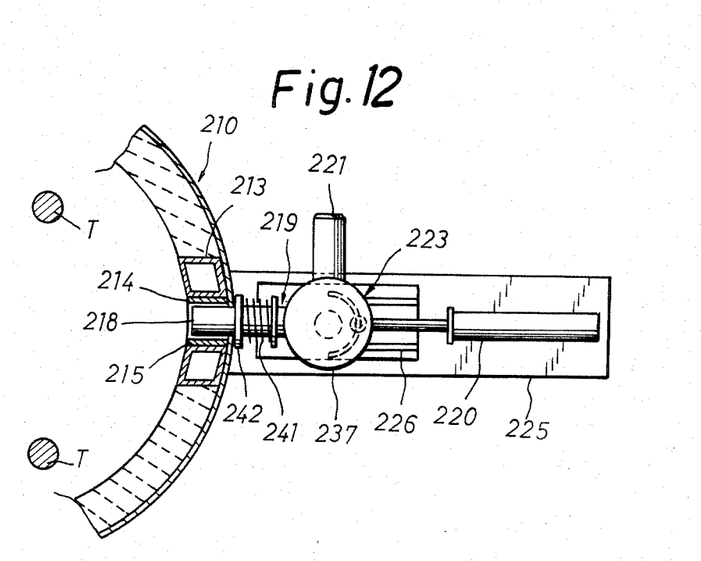

FIGS. 1 (1) and (2) show a movable burner apparatus, which has the following construction.

With reference to these drawings, a furnace wall 2 surrounding electrodes 1 is formed with a burner inserting bore 3. The tip 5 of a burner body 4 having a fuel nozzle, an oxygen nozzle, etc. is movable into and out of the bore 3 by piston-cylinder means 6.

For combustion, the piston of the means 6 is forced out to insert the tip 5 into the bore 3 as seen in FIG. 1 (1). When the burner is not in use, the piston of the means 6 is retracted to hold the tip 5 away from the bore 3 as seen in FIG. 1 (2), and compressed air is supplied from a compressor or blower through the burner body 4 to prevent the inserting bore 3 and the burner nozzles from clogging up with splashes and slag from the interior of the furnace.

With the conventional apparatus, however, a large amount of air is required for purging and therefore consumes energy, and the air forced into the furnace results in a great heat loss and adversely affects the metallurgical reaction.

To eliminate these problems, it is attempted to provide a splash blocking plate 7 in front of the tip 5 as shown in FIG. 1 (2), but in this case there arises the problem that splashes will accumulate in the burner inserting bore 3.

In addition to these problems, it is impossible to completely prevent the molten charge and slag from splashing out from the furnace, so that the bore is manually cleaned after the discharge of the molten material. However, this requires a heavy labor at a high temperature and is inefficient.

Further when a bumping phenomenon occurs within the furnace, molten steel and slag flows out through the burner inserting bore 3, causing damage to the burner apparatus.

Figure 1:
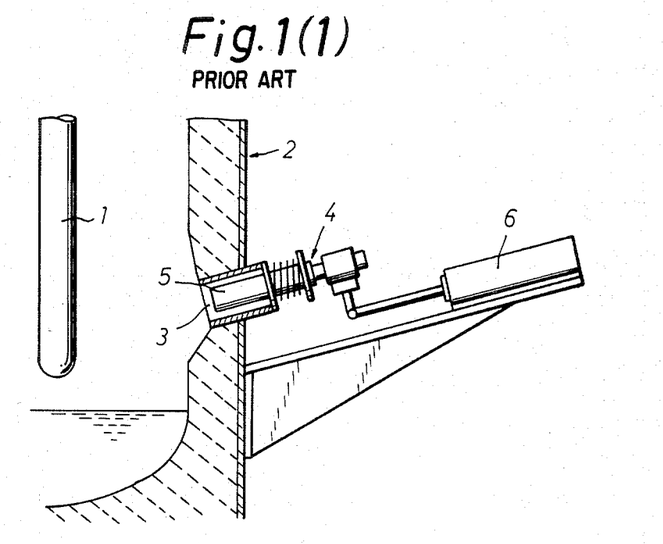
Figures 2, 3:
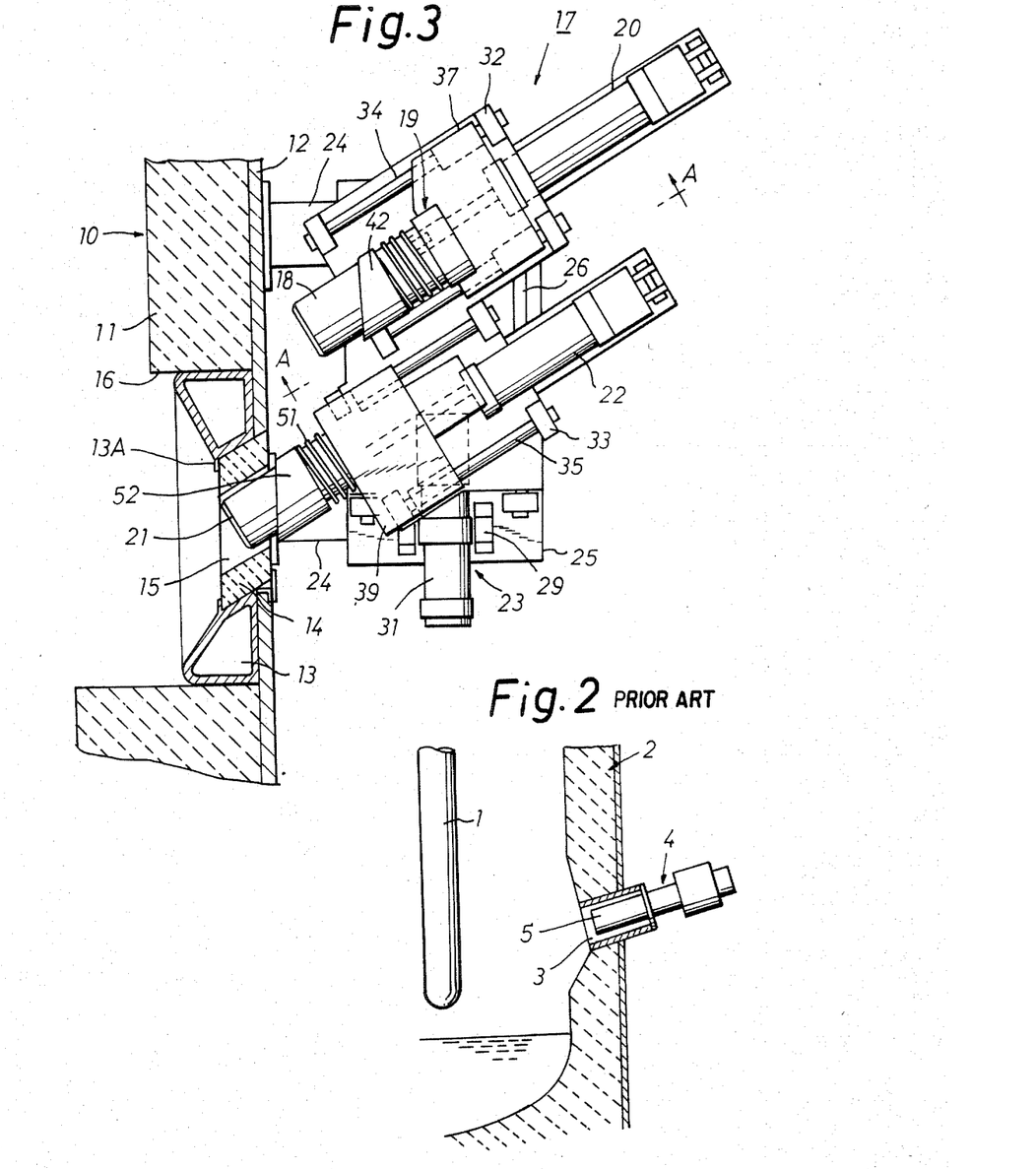
FIG. 2 is a sectional view showing a conventional burner apparatus of the fixed type.
FIG. 3 is a sectional view showing a first embodiment of the invention with a seal bar inserted in a burner inserting bore.

To overcome these drawbacks of the movable burner apparatus, a fixed burner apparatus has been proposed as seen in FIG. 2. The burner body 4 of the apparatus is provided with a tip 5 having a fuel nozzle, oxygen nozzle and a purging air nozzle and fixedly installed in a burner inserting bore 3 of a furnace wall 2 surrounding electrodes 1.

The fixed apparatus is adapted to prevent the outflow of molten steel and slag but has the necessity of purging the burner at all times to prevent the nozzles from clogging.

Since the burner apparatus is used only for auxiliary combustion, it is used only for 20 to 40% of the operating period of the furnace and must therefore be purged with air for the remaining 60 to 80% of the period. Consequently the air cools the interior of the furnace, produces an extremely serious adverse effect on the metallurgical reaction and entails a seriously reduced combustion efficiency.

SUMMARY OF THE INVENTION

An object of the present invention, which has been accomplished in view of the foregoing problems, is to provide a burner apparatus comprising a burner body having a combustion tip adapted to be inserted into a burner inserting bore during auxiliary combustion, and a seal bar separate from the burner body and adapted to be inserted in the burner inserting bore during the cessation of auxiliary combustion in place of the burner tip to prevent the bore and the burner nozzles from clogging without the necessity for air purging.

Another object of the present invention is to provide a burner apparatus of the type described wherein the burner tip is positioned outside the furnace as drawn out therefrom during the cessation of auxiliary combustion, with the seal bar inserted in the burner inserting bore, so that the burner tip can be inspected and repaired easily with safety during the cessation.

Another object of the invention is to provide a burner apparatus of the type described by which the burner inserting bore is closed with the burner tip or the seal bar whether during the combustion period or during the cessation of auxiliary combustion to lessen noises and reduce damage even if a bumping phenomenon occurs.

Another object of the invention is to provide a cooling box and a heat-resistant sleeve to define the burner inserting bore and to cover the burner tip and the seal bar with a heat-resistant material to reduce the deposition of splashes in the bore and on these members and enable the burner to operate efficiently.

To fulfull these objects, the present invention provides a burner apparatus comprising a burner body having a tip insertable into and withdrawable from a burner inserting bore formed in the wall of a smelting furnace, a seal bar insertable into and withdrawable from the bore for closing the bore, shifting means for alternatively positioning the tip or the seal bar on an extension of the axis of the bore in alignment therewith, and means for driving the tip and the seal bar into and out of the bore.

Embodiments of the present invention will be described below in greater detail with reference to the accompanying drawings.

BRIEF DESCRIPTION OF THE DRAWINGS

FIG. 1 (1) is a sectional view showing a conventional burner apparatus of the movable type during operation for auxiliary combustion;

FIG. 1 (2) is a sectional view showing the same with the burner in a retracted position during the operation of a furnace;

FIGS. 10 and 11 are a plan view and a sectional elevation, respectively, showing a second embodiment of the invention; and FIGS. 12 and 13 are a plan view and a sectional elevation, respectively, showing a third embodiment of the invention.

DESCRIPTION OF THE PREFERRED EMBODIMENTS

With reference to FIGS. 3 to 6 showing a first embodiment, an electric furnace has a wall 10 comprising bricks 11 and an iron shell 12. The furnace wall 10 is formed with a burner inserting bore 15 defined by a water-cooling copper jacket 13 and a heat-resistant sleeve 14.

With the present embodiment, the furnace wall 10 has an aperture 16 having fitted therein the water-cooling jacket 13 in the form of a copper ring and having an inner peripheral flange 13A. The heat-resistant sleeve 14 is fixedly inserted in the jacket 13, with the inner space of the sleeve 14 serving as the bore 15. The axis of the bore is inclined as directed to the center of bottom of the furnace.

The furnace wall 10 has a plurality of such bores 15, for each of which there is provided a burner apparatus 17 serving as an auxiliary combustion apparatus and disposed outside the furance wall 10.

The burner apparatus 17 comprises a burner body 18 having a tip 18 at its forward end, a drive assembly 20 which is hydraulic piston-cylinder means in the present embodiment for withdrawably inserting the tip 18 into the bore 15, a seal bar 21 for closing the bore 15, a drive assembly 22 which is illustrated as hydraulic piston-cylinder means for driving the seal bar 21, and shifting means 23 for alternatively positioning the tip 18 and the seal bar 21 on an extension of the axis of the bore 15 in alignment therewith.

With the first embodiment, a support 25 is fixed to the furnace shell 13 by legs 24. Two guide rods 26 positioned in a vertical plane are attached to the support 25. A lift member 28 is supported by sliders 27 on the guide rods 26 and is movable in the direction of the height of the furnace. A bracket 29 on the lift member 28 is coupled to a bracket 29 on the support 25 by a drive assembly 31, which is hydraulic piston-cylinder means in the case of the present embodiment. Thus the support 25, the lift member 28 and the drive assembly 31 constitute the shifting means 23.

Upper pairs of bearings 32 and lower pairs of bearings 33 are mounted on one upright side of the lift member 28 at corners thereof, with the bearings in each pair opposed to each other to support a guide rod. Thus guide rods 34 and 35 are supported by the bearings 32 and 33, as arranged one above another in parallel and also in parallel with the axis of the inserting bore 15.

A burner mount 37 is supported by sliders 36 on the upper pair of guide rods 34, while a seal bar mount 39 is supported by sliders 38 on the lower pair of guide rods 35. These mounts 37 and 39 are slidable on the guide rods.

Figure 5:
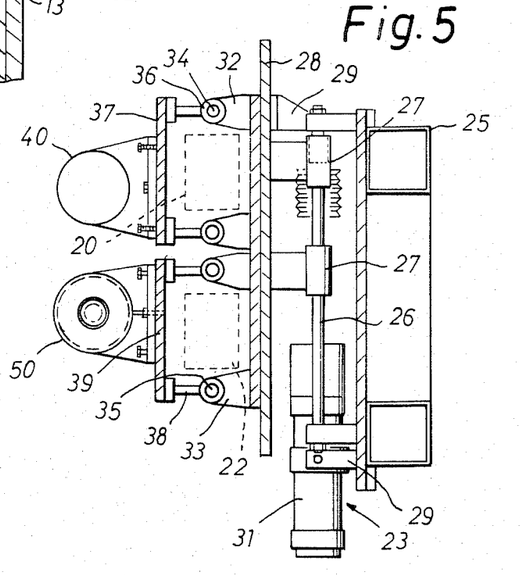
FIG. 5 is a front view of the same.
Figure 6:
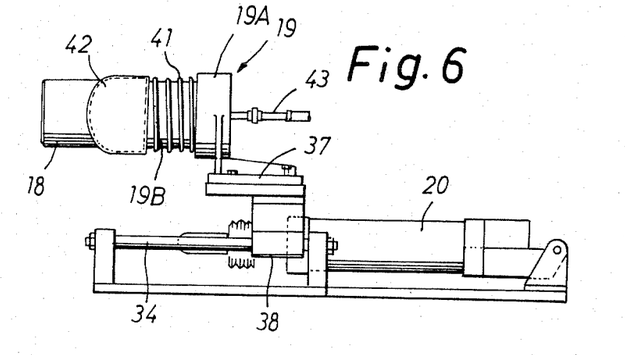
FIG. 6 is a view showing the same as it is seen in the direction of the line A—A in FIG. 3.

The burner body 19 is attached to the mount 37 by a bracket shown in FIGS. 5, 6 and includes a distributing portion 19A and a cylindrical portion 19B to which the tip 18 is connected. The tip 18 houses a fuel nozzle and an oxygen nozzle. The cylindrical portion 19B has wounded thereon a coiled spring 41 for biasing a muffling cover 42 slidably fitting around the portion 19B.

Figure 4:
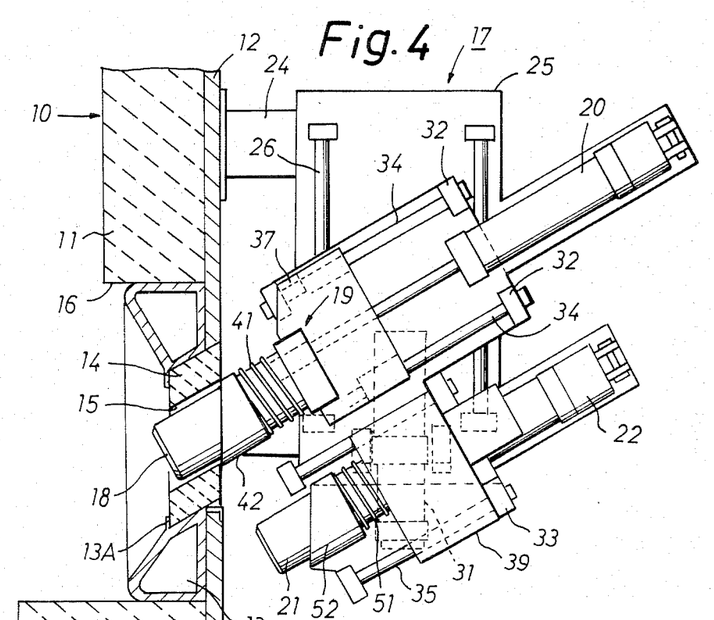
FIG. 4 is a sectional view showing the same with the burner tip inserted into the bore.

The burner mount 37 is coupled to the lift member 28 by the drive assembly 20. With the present embodiment, the extension of the drive assembly 20 moves the burner mount 37 along the guide rods 34, inserting the burner tip 18 into the bore 15 as seen in FIG. 4 and causing the muffling cover 42 to close the bore. When contracted, the drive assembly 20 withdraws the burner tip 18 from the bore 15.

Figure 7:
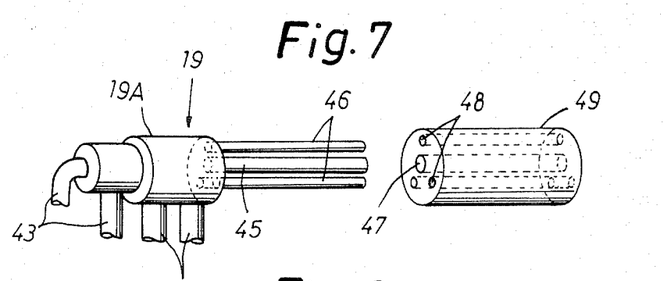
FIG. 7 is an exploded perspective view showing an example of burner.
Figure 8:
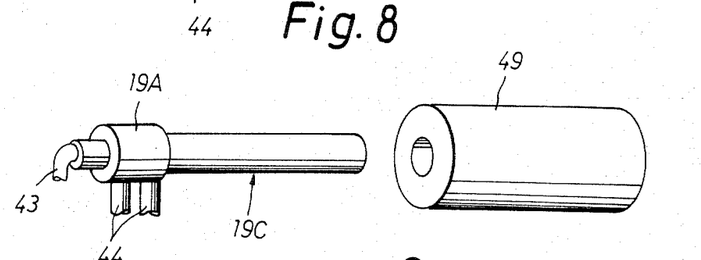
FIG. 8 is an exploded perspective view showing another example of burner.

The tip 18 can be formed from stainless steel, cast iron or the like. FIGS. 7 and 8 show preferred examples of burners.

With the burner of FIG. 7, the distributing portion 19A having fuel supply and discharge pipes 43 and oxygen supply and discharge pipes 44 further has a single fuel nozzle pipe 45 projecting from its center and oxygen nozzle pipes 46 projecting from the portion 19A and arranged radially. A heat-resistant sleeve 49 having nozzle pipe passing channels 47, 48 covers the pipes 45, 46. The heat-resistant sleeve 49 is removably attached to the distributing portion 19A by screwing or some other means. Graphite or carbon magnesia refractory, when used for making the sleeve 49, serves to reduce deposition of splashes of molten metal and slag and protect the sleeve against thermal damage. Further when the clearances in the channels 47, 48 around the pipes 45, 46 are filled with a carbon paste and the sleeve 49 is externally coated with the paste, a ceramic or like oxidation-resistant material, the material reduces the degree of oxidation due to backfire flames and the high-temperature atmosphere within the furnace.

The burner of FIG. 8 comprises a single barrel 19C which is fixedly sheathed with a heat-resistant sleeve 49. The same oxidation-resistant material as above is similarly applied to the sleeve 49.

When the heat-resistant sleeve 14 on the furnace wall 10 is made of graphite or carbon magnesia refractory, the burner nozzles need not always be protected by the heat-resistant filling material or coating.

The seal bar 21, which is in the form of a solid cylinder, is attached to the mount 39 by a bracket 50 as shown in FIG. 5. A muffling cover 52, slidably fitting around the seal bar 21, is biased by a coiled spring 51.

The drive assembly 22 is connected between the seal bar mount 39 and the lift member 28. When extended, the assembly 22 moves the mount 39 on the guide rods 35, inserting the seal bar 21 into the bore 15 and causing the muffling cover 52 to close the bore as seen in FIG. 3. The seal bar 21 is withdrawn from the bore 15 by the contraction of the drive assembly 22.

The seal bar 21 can be made in the form of a solid cylinder from graphite, carbon magnesia refractory or cast steel. Alternatively the bar 21 can be of the structure shown in FIG. 9.

Figure 9:
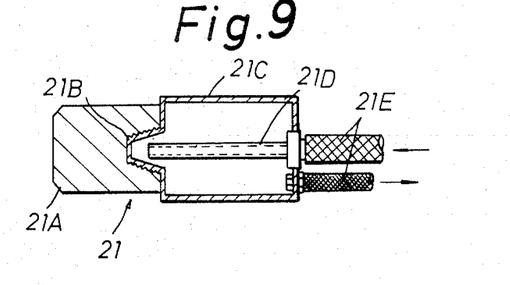
FIG. 9 is a sectional view showing an example of seal bar.

The seal bar 21 shown comprises a tip 21A of graphite, cast steel or the like, a water-cooling jacket tube 21C having a tapered threaded portion 21B screwed into the tip 21A, and a cooling water pipe 21D extending on the axis of the tube 21C to the threaded portion 21B. Cooling water is supplied to and discharged from the tube 21C through pipes 21E to give improved heat resistance.

Since the burner body and the seal bar are moved as stated above, the supply and discharge pipes 43, 44 and 21E are flexible pipes permitting the movement.

Figure 10:
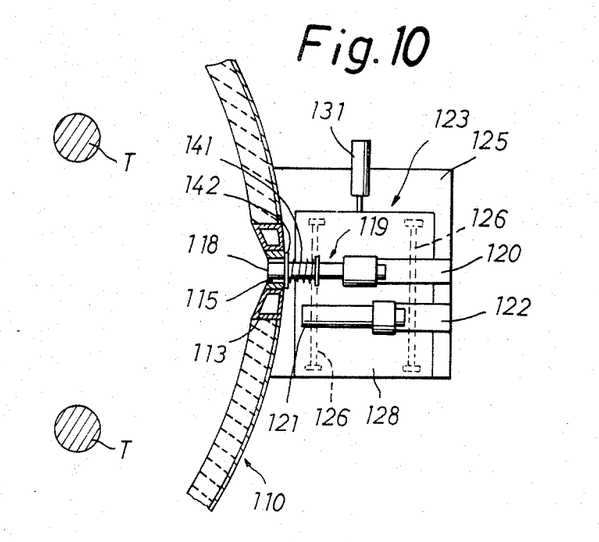

FIGS. 10 and 11 show a second embodiment of the invention which is based on the same concept as the first embodiment and in which the tip of a burner body and a seal bar are movable on a lateral plane parallel to a plane through the axis of a burner inserting bore by alternatively shifting means 123.

With reference to FIGS. 10 and 11, a furnace wall 110 surrounding electrodes T is formed with a burner inserting bore 115 which is provided by a heat-resistant sleeve 114. The sleeve 114 is surrounded by a water-cooling jacket 113.

A movable member 128 is supported by guide rods 126 on a support 125 projecting laterally from the furnace wall 110. The movable member 128 is slidable on a lateral plane in parallel with a plane through the axis of the bore 115. The movable member 128 is coupled to the support 125 by a drive assembly 131 which is hydraulic piston-cylinder means. The support 125, the movable member 128 and the drive assembly 131 constitute the shifting means 123.

Mounted on the movable member 128 are a burner body 119 reciprocatingly movable by the contraction and extension of a drive assembly 120, and a seal bar 121 reciprocatingly movable by the contraction and extension of a drive assembly 122. Thus one of the burner tip 118 and the seal bar 121 is selectively insertable into and withdrawable from the burner inserting bore 115.

Figure 13:
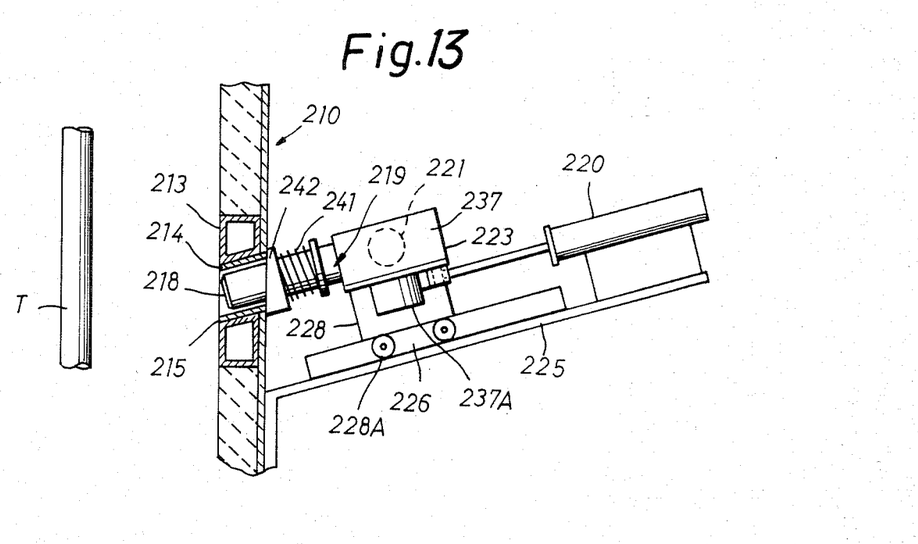

FIGS. 12 and 13 show a third embodiment including shifting means 223 of the swivel type. A furnace wall 210 surrounding electrodes T has a burner inserting bore 215 which is provided by the bore of a heat-resistant sleeve 214. The sleeve 211 is surrounded by a water-cooling jacket 213.

A support 225 projecting laterally is attached to the furnace wall 210. Two guide rails 226 provided on the support 225 are positioned below and in parallel with a plane through the axis of the bore 215. A movable member 228 has wheels 228A rollingly movable along the rails 226. A turntable 237 mounted on the movable member 228 is rotatable by a rotary actuator 237A about an axis intersecting the plane through the bore axis at right angles.

A seal bar 221 and a burner body 219 having a tip 218 and a muffling cover 242 biased by a spring 241 are arranged at a right angle to each other and projected from the outer periphery of the turntable 237. The movable member 228 is movable toward and away from the furnace wall by a drive assembly 220.

The embodiments described above are operated in the following manner. FIGS. 4 and 10 to 13 show the burner tip 18 (118, 218) as inserted in the bore 15 (115, 215) for the auxiliary combustion of scrap, etc. within the furnace with the fuel and oxygen forced out from the nozzles in the tip.

During the period of auxiliary combustion which is 20 to 40% of the entire period of operation of the furnace, the muffling cover 42 (142, 242) which is biased by the spring 41 (141, 241) to close the bore 15 (115, 215) deadens noises and prevents overflow of molten metal due to bumping.

When the auxiliary combustion has been completed as contemplated, the burner tip 18 (118, 218) is withdrawn from the bore 15 (115, 215) by the contraction of the drive assembly 20 (120, 220). The burner tip 18 (118, 218) is thereafter moved to a standby position, with the seal bar 21 (121, 221) alternatively brought into alignment with the bore 15 (115, 215), by the extension of the drive assembly 31 in the first embodiment, or by the contraction of the drive assembly 131 in the second embodiment, or by the operation of the rotary actuator 237A in the third embodiment. The seal bar 21 (121, 221) is then inserted into the bore 15 (115, 215) to close the bore by the extension of the drive assembly 22 in the first embodiment, or of the drive assembly 122 in the second embodiment, or of the drive assembly 220 in the third embodiment.

Thus the charge can be smelted by the electrodes with the molten metal and noises confined in the furnace by the seal bar 21 (121, 221) inserted in the bore 15 (115, 215). On completion of the contemplated smelting operation, the molten metal is discharged from an unillustrated outlet.

While the bore 15 (115, 215) is held closed with the seal bar 21 (121, 221), the burner tip 18 (118, 218) and the nozzles can be cleaned for the removal of splashes. The burner tip 18 (118, 218), when covered with a heat-resistant material, is easy to clean.

During the operation with the bore 15 (115, 215) held closed with the seal bar 21 (121, 221), no air is introduced for purging. This assures satisfactory metallurgical reaction and a high combustion efficiency.

According to the invention described above, the seal bar closing the burner inserting bore during operation except during auxiliary combustion prevents the bore and nozzles from clogging and permits inspection and repair of the burner nozzles with safety and ease.

Since the closing of the bore with the seal bar eliminates the need for air purging, the metallurgical reaction proceeds effectively. Further because the bore is closed with the burner tip or seal bar at all times, noises can be deaded effectively, while the apparatus is protected against damage even if bumping occurs.

Because the air for purging can be dispensed with, the present apparatus has the following economical advantage.

Usually the electric furnace is equipped with three burners between three electrodes. One burner consumes 50 m³/h of air.

The air cost for the three burners is therefore 3×50 m³/h× ¥6= ¥900/h. Since air purging is conducted during 70% of the entire smelting period, the air cost per month is 25 days×24 h×0.7× ¥900/h= ¥378,000. Accordingly the present invention assures a cost reduction at least by this amount.

The heat loss resulting from the air introduced into the furnace for purging is 3×50 m³/h×0.7×(1100° C.−30° C.)×0.33 Kcal/m³×25 days×24 h/860 Kcal/kwh=25,800 kwh/month=25,800 kwh×15 days/kwh= ¥387,000/month. Thus the overall cost reduction is at least ¥765,000/month.

What is claimed is:

1. A burner apparatus for a smelting furnace comprising:
    a burner body having a tip insertable into and withdrawable from a burner inserting bore formed in the wall of the furnace;
    a seal bar insertable into and withdrawable from the inserting bore for closing the bore;
    shifting means for alternatively positioning the tip or the seal bar on an extension of the axis of the inserting bore in alignment therewith;
    means for driving the tip and the seal bar into and out of the inserting bore, and wherein the shifting means comprises a stationary support, a lift member supported on the support and movable in the direction of the height of the furnace and a drive assembly for the lift member, and the burner body and the seal bar are supported on the lift member and arranged side by side in the direction of the height of the furnace, the lift member being provided with drive assemblies for respectively reciprocatingly moving the tip and the seal bar into and out of the inserting bore.

2. A burner apparatus as defined in claim 1 wherein the shifting means comprises a stationary support, a movable member supported on the support and movable on a lateral plane parallel with a plane through the axis of the inserting bore and a drive assembly for the movable member, and the burner body and the seal bar are arranged side by side on the upper side of the movable member, the movable member being provided with drive assemblies for respectively reciprocatingly moving the tip and the seal bar into and out of the inserting bore.

3. A burner apparatus as defined in claim 1 wherein a water-cooling jacket is provided in the furnace wall around the inserting bore, and each of the tip of the burner body and a tip of the seal bar is covered with a heat-insulating member.

4. A burner apparatus as defined in claim 1 wherein a heat-resisting sleeve is fixedly fitted in the furnace wall to define the inserting bore, and a water-cooling jacket is formed in the interior of the seal bar.

* * * * *